Figure 1:
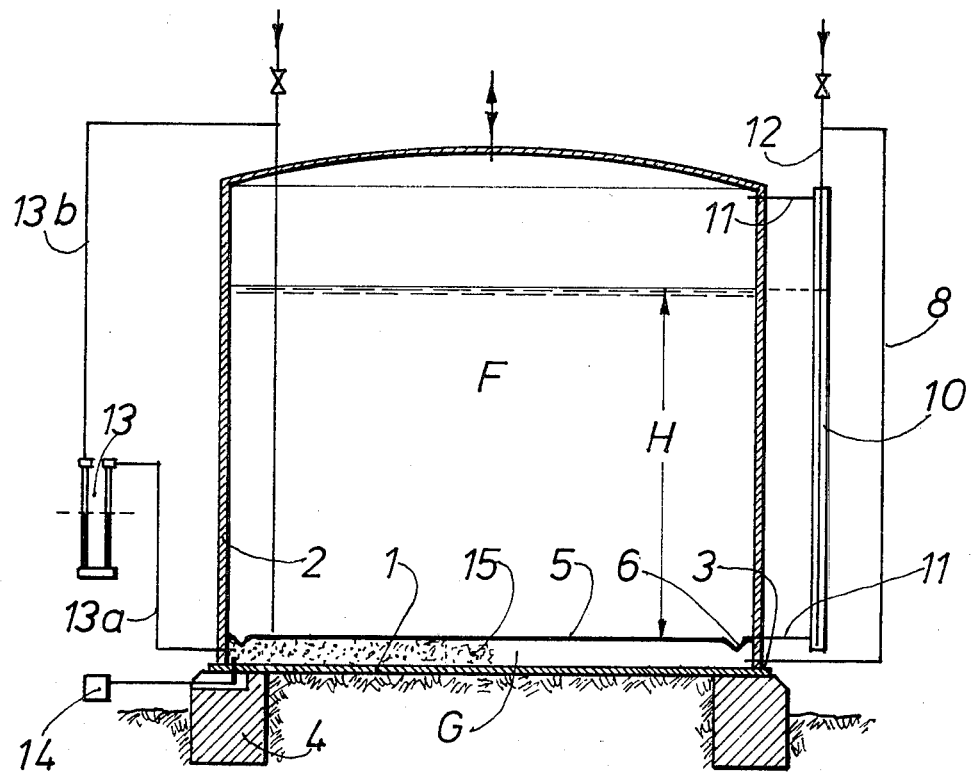

United States Patent [19]
Rupf-Bolz

[11] 3,902,356
[45] Sept. 2, 1975

[54] SAFETY DEVICE FOR USE IN TANKS FOR LIQUIDS

[76] Inventor: Otto Rupf-Bolz, Am Kriegsbergturm 44, Stuttgart, Germany, D7000

[22] Filed: Dec. 13, 1973

[21] Appl. No.: 424,448

[30] Foreign Application Priority Data
Dec. 19, 1972 Germany.............................. 2262099
Aug. 29, 1973 Germany.............................. 2343454

[52] U.S. Cl. ............................................... 73/49.2
[51] Int. Cl. .............................................. G01n 3/12
[58] Field of Search......... 73/49.2, 40.5 R; 220/9 A, 220/9 LG

[56] References Cited
UNITED STATES PATENTS
2,460,054   1/1949   Wiggins........................... 73/40.5 R
3,214,963   11/1965   Schlumberger et al.............. 73/49.2
3,472,062   10/1969   Owen............................... 73/40.5 R
3,489,311   1/1970   Folkerts et al.................... 73/49.2 X Primary Examiner—Jerry W. Myracle
Attorney, Agent, or Firm—Herbert L. Lerner

[57] ABSTRACT

A safety device for use in tanks for liquids, especially in large-capacity tanks for hydrocarbons or other liquids capable of polluting the environment, for indicating a leakage and/or averting its consequences. A separating bottom provides a gastight seal in a cross section of the tank in the vicinity of the bottom, said separating bottom in conjunction with the bottom of the tank forming a gas-filled space which is free from any liquid. The gas pressure is measurable and/or controllable approximately corresponding to the respective hydrostatic pressure of the liquid inside the tank. Means are provided to actuate an alarm in case of a leak.

24 Claims, 10 Drawing Figures

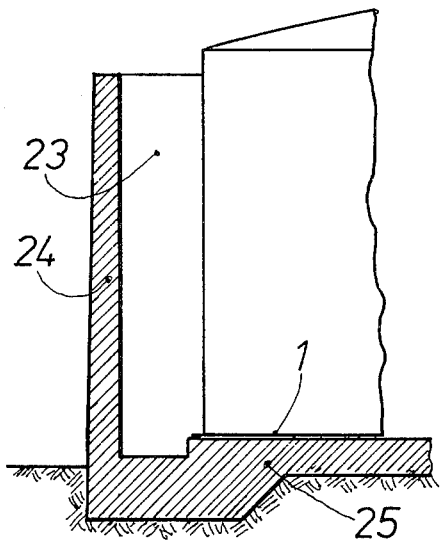
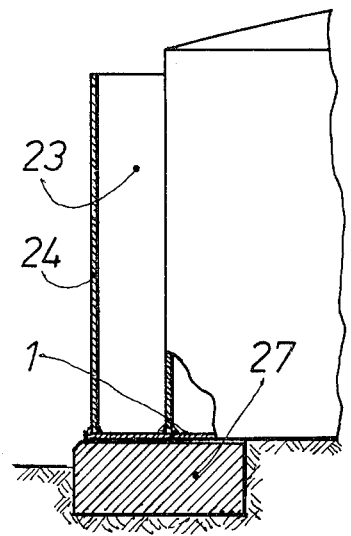
Fig.6　　Fig.7
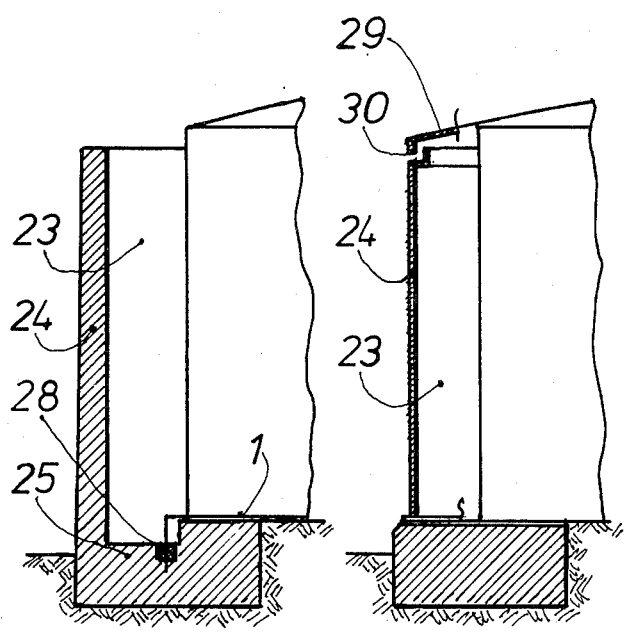
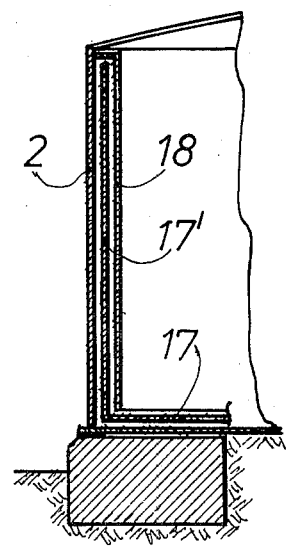
Fig.8　　Fig.9　　Fig.10

SAFETY DEVICE FOR USE IN TANKS FOR LIQUIDS

The present invention relates to a safety device for use in tanks for liquids, especially in large-capacity tanks for hydrocarbons or other liquids capable of polluting the environment, to indicate a leakage and/or avert its consequences.

For the prevention of ground pollution, contamination of subsoil water, for reasons of fire protection, and the avoidance of loss of liquid during storage, leakages of tanks and minor leaks must be indicated at the inception stage and precaution taken to prevent the liquid from seeping into the soil.

An increased hazard, especially in large-capacity tanks, is presented by the bottom and the joint between the vertical shell of the tank and the bottom. The inevitable unevenness in the finish-laid bottom exposes the sheets and weld seams to flexural stresses which, with changing liquid column, are subject to continuous variations and thus increase the risk of leakage.

It is known that small tanks are sometimes placed in special collector trays of steel concrete or steel construction. Such configurations are not only very expensive but also hold the major disadvantage that any leakage in these collector tanks goes entirely unnoticed so that in the event of a leakage in the tank there is no adequate protection to prevent the liquid from seeping into the soil.

It is also known to provide a second steel sheet bottom, mainly in domestic tanks for fuel oil, so that, in the event of a leakage of the first bottom, the second bottom prevents the liquid from spilling out of the tank until the second bottom also springs a leak. Therefore, a leakage of the tank is only delayed but ultimately not prevented. As the springing of a leak is not indicated, leaking out of the tank goes unnoticed.

The novel features which are considered characteristic of the present invention are providing an impermeable bottom of the tank in the area of the shell located in the vicinity of the bottom.

It is, therefore, a principal object of the invention to detect any leakage in the tank at the inception stage and to use the built-in safety device to prevent the liquid from issuing from the tank in the event of a leakage.

Another object of the invention is to use a separating bottom which provides a gastight seal in the cross section of the tank in the vicinity of the bottom, said separating bottom in conjunction with the bottom of the tank forming a gas-filled space, which is free from any liquid, with the gas pressure measurable and/or controllable by well-known methods at least approximately corresponding to the respective hydrostatic pressure of the liquid inside the tank.

By creating such a gas-filled space, as desired, it is achieved that no liquid, but only gas can escape when the bottom of the tank springs a leak. The associated change in pressure in the gas-filled space can be utilized for the instantaneous indication of a leakage. If the pressure in the gas-filled space for compensating for the dead weight of the separating bottom is chosen to be greater than the respective hydrostatic pressure of the liquid inside the tank, for instance by supplying gas, the result is that the separating bottom is not subjected to a load. This equalization of pressure allows the separating bottom to be constructed as a thin wall so that also plastics or superior-quality corrosion-resistant materials may be economically used.

The separating bottom can be firmly connected to the wall of the tank. In the event of a leakage occurring in the range of the bottom of the tank the pressure in the gas-filled space drops so that the separating bottom is almost exclusively subjected to the load of the liquid. To counteract this load, it is another object of the invention to fill up the gas-filled space with a porous material, such as sand, on which the separating bottom comes to rest, or provision is made for the use of stays which absorb the pressure of the liquid in the event of a drop in the pressure prevailing in the gas-filled space. In the event that the separating bottom or the range where it is fastened to the wall of the tank springs a leak, the liquid can enter the gas-filled space after the over-pressure has expanded. To detect such a condition, the invention provides for the use of an instrument which, connected to the gas-filled space, indicates the presence of liquid in the latter.

Another object of the invention is to connect the separating bottom through flexible members to the wall of the tank so that the gas pressure to some extent automatically adapts to the respective hydrostatic pressure of the liquid inside the tank. An especially simple method of sealing the gas-filled space from the liquid space used a cup-shaped separating bottom resting on the bottom of the tank, the wall of said separating bottom being covered by an apron which forms a gastight connection with the wall of the tank in such a way that a gastight separation of the two spaces is obtained upon filling the tank. By introducing gas into the gas-filled space upon filling the tank, the gas-filled space can be made to extend up to the end of the apron. If the hydrostatic pressure of the liquid drops, e.g. during emptying of the tank, the gas escapes through the liquid into the atmosphere. The supply of gas can at least partly be dispensed with if the apron is appropriately designed in such a manner that, even with full tank, because of the compression of gas in the spaces between the apron and the wall of the tank, the liquid inside the tank does not reach up to the rim of the cup-shaped separating bottom.

For this purpose the apron may be designed as an annular truncated cone with its small diameter facing the bottom to prevent the liquid from entering the gas-filled space with rising liquid level. For the same purpose the apron may be designed in such a manner that the distance relative to its section extending along the wall of the tank from the wall of the cup-shaped separating bottom is larger than the distance between the latter and the wall of the tank. If the bottom of the tank and/or the section of the wall of the tank covered by the apron springs a leak, this may be the whole wall of the tank, depending on the point where the apron is fastened, gas escapes from the gas-filled space but, with a minor leakage, the precaution described will cause the liquid not to enter the gas-filled space or at least cause to enter it with a considerable delay. However, if the loss of gas is equalized to maintain the gas pressure corresponding to the hydrostatic pressure, the liquid inside the tank cannot reach the rim of the tray even if the precaution described is not taken.

However, if the separating bottom springs a leakage the liquid enters the gas-filled space as the hydrostatic pressure acting on the separating bottom is slightly higher than the gas pressure given by the immersion depth at the end of the apron situated above the bottom. At the end of the apron there prevails the hydrostatic pressure H . γ. The pressure in the gas-filled space equals (H-h) . γ. By supplying gas while the tank is being filled H=0 and thus the gas pressure may become = H . γ, i.e. it equals the hydrostatic pressure prevailing at the end of the apron. The gas pressure cannot increase any further as the amount of gas then supplied escapes through the liquid. Therefore, the maximum gas pressure is given by the hydrostatic pressure H . γ. If the separating bottom springs a leakage, liquid escapes into the gas-filled space, as the separating bottom is subject to the hydrostatic pressure =H. γ plus the height of the distance between the end of the apron and the collector tray, multiplied by γ. Therefore, the hydrostatic pressure acting on the bottom of the tray is always higher than the maximum gas pressure. This difference in pressure exists as there must be a distance, no matter how small, between the end of the apron and the bottom of the tray. This is avoidable if the bottom section of the cup-shaped separating bottom is curved or raised toward the interior of the tank to such an extent that as large a section of the bottom portion as possible is situated at a higher level than the bottom end of the apron. This arrangement ensures that the gas pressure acting on this elevated section is higher than the hydrostatic pressure of the liquid. Therefore, if this elevated section springs a leak, gas enters the liquid but no liquid enters the gas-filled space; the latter is one of the objects of the present invention.

The design of the bottom of the tank should preferably conform to that of the bottom of the tray. The same purpose is served and additional advantages are obtained by the use of a cup-shaped, inverted separating bottom, which covers the major part of the botton, and if this part of the bottom is so designed that the area of the bottom covered by the inverted separating bottom is situated at a higher level than the rim of the tray. For the prevention of buoyancy, this separating bottom is additionally loaded by weights.

This configuration holds significant advantages for the storage of extremely cold liquids such as nitrogen, methane or ammonia.

It is known that a well-defined hydrostatic pressure must prevail at the pump entry at the time certain liquids are pumped out of the tank. Therefore, the tank can be emptied only down to a certain liquid level. Therefore, the described design of the bottom of the tank results in a smaller residual volume inside the tank.

It is also an object of the invention to prevent liquid that has leaked past the shell of the tank from reaching the surrounding bottom. Another embodiment of the invention provides for the tank to be arranged in a collector tray of well-known design so that in the event of a leakage in the shell of the tank the issuing liquid cannot seep into the soil unnoticed. Therefore, this collector tray must be designed so as to be leakproof. With smaller tanks, this can be achieved with means that are reasonably justifiable. If the collector tray consists of steel concrete, the required leakproofness can be achieved by prestressing the steel concrete or by appropriately lining the interior wall of the tray, for instance with a film. However, such action is economically justifiable only with small tanks, no longer with large-capacity tanks which are normally placed on annular foundations.

This annular foundation may be constructed in such a manner that it also carries the collector tray, but it should be considered that in the event of a leakage liquid may flow from the collector tray underneath the bottom of the tank into the subsoil, as there is no leakproof connection between the bottom of the tank and the annular foundation.

Therefore, with a metal construction of the shell of the collector tray as described in this invention, the bottom of the tank, also consisting of metal, extends beyond the latter up to the shell of the collector tray and is joined with the shell, for instance by welding, to provide a leakproof connection.

If the steel concrete shell of the collector tray is for instance made in one piece integrally with the annular foundation of the tank so as to leakproof the metallic bottom of the tank as described in the invention, it may be extended by a certain distance beyond the latter and connected at an angle to the annular foundation so as to be leakproof. This angled section of the extended bottom may be inserted into an annular groove of the annular foundation, with the annular groove being filled up with an elastic compound. The angled section itself may also be designed so as to be flexible, for instance as a corrugation, so that the end of the angled section can be firmly embedded into the foundation.

If the gas-filled space and the liquid space are jointly sealed by a cup-shaped separating bottom resting on the bottom of the tank, with the wall of the tray covered by an apron forming a gastight connection with the wall of the tank in such a manner that a gas-tight separation of both spaces is obtained at the time of filling the tank, another embodiment of the invention provides that the apron is connected gastight in the upper range of the tank to the latter and the wall of the cup-shaped separating bottom is correspondingly raised so that the cup-shaped separating bottom performs the function of the tank which now serves as collector tray.

The apron whose task it is to create a space, in which the gas pressure compensates for the hydrostatic pressure of the tank filling, should preferably be so arranged that the top edge of the cup-shaped separating bottom is situated above the maximum liquid level.

Other features which are considered as characteristic for the invention are set forth in the appended claims.

Although the invention is illustrated and described herein as embodied in particular embodiment, it is nevertheless not intended to be limited to the details shown, since various modifications and structural changes may be made therein without departing from the spirit of the invention and within the scope and range of equivalents of the claims.

Figure 2:
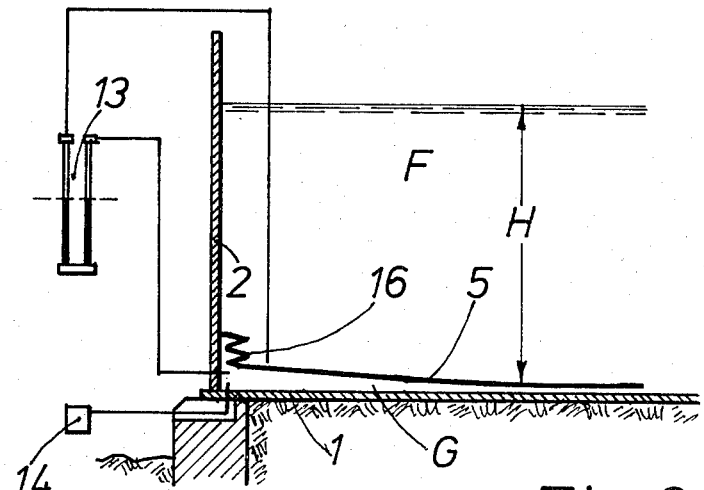
Figure 3:
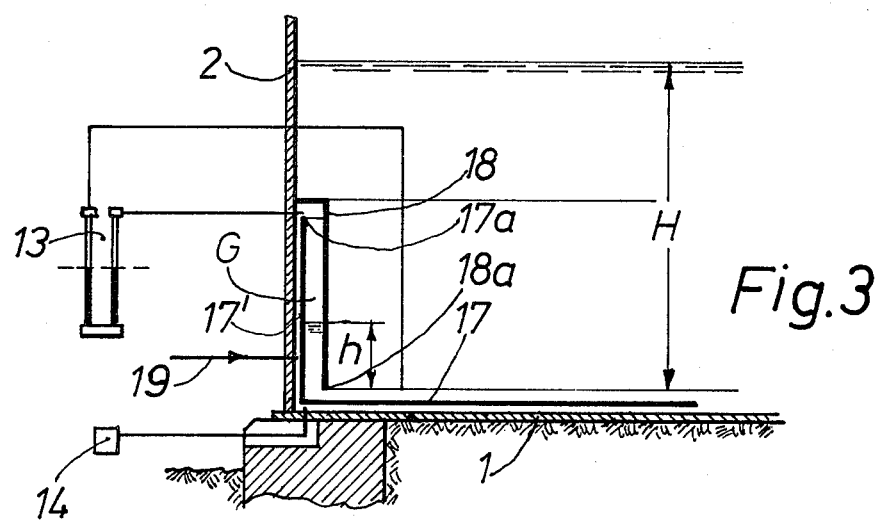
Figure 4:
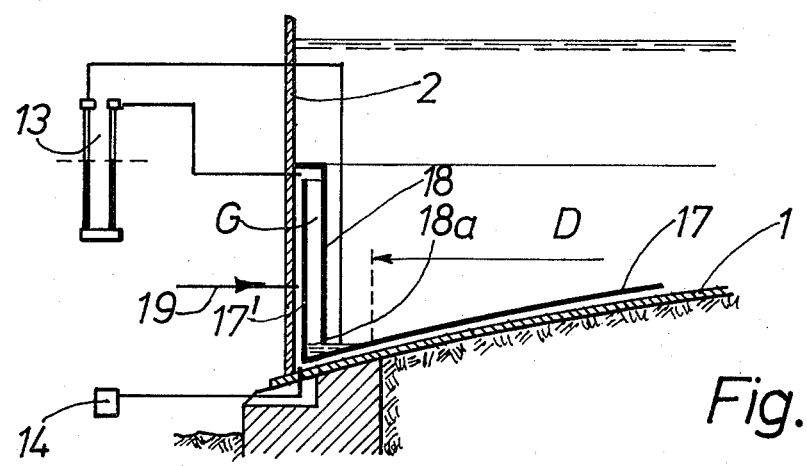
Figure 5:
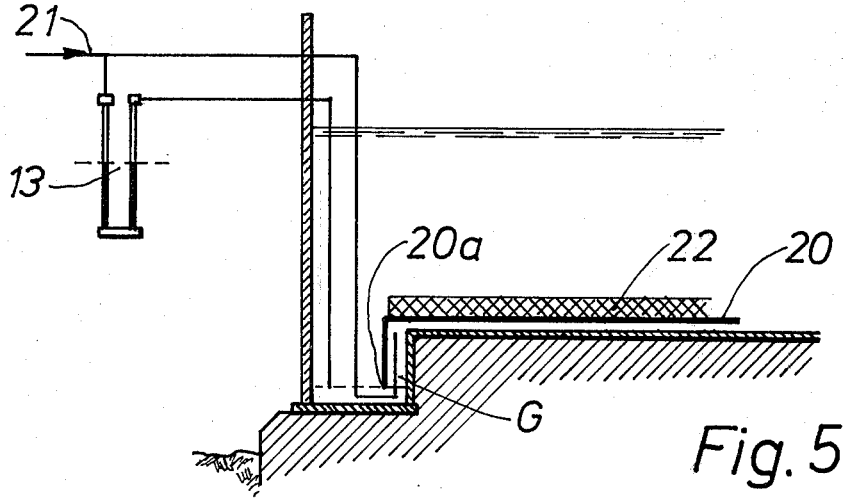

The construction and method of operation of the invention, however, together with additional objects and advantages thereof will be best understood from the following description of specific embodiments when read in connection with the accompanying drawings, in which:

FIG. 1 is an elevation sectional view of a tank having a permanently installed separating bottom, FIG. 2 is an elevation sectional view along a flexibly suspended separating bottom, FIG. 3 is an elevation sectional view along a cup-shaped separating bottom, FIG. 4 is a sectional view along a tank having a raised separating bottom and tank bottom, FIG. 5 is a sectional view along the tank having a cup-shaped, inverted separating bottom, FIG. 6 is an elevation sectional view of a tank having a collector tray with shell and bottom of steel concrete construction, FIG. 7 is an elevation sectional view of a collector tray having a shell and bottom of steel construction, FIG. 8 is an elevational sectional view of a steel concrete collector tray the bottom of which also serves as annular foundation for the tank, FIG. 9, is an elevation sectional view of a collector tray as shown in FIG. 7, the shell of which is raised up to the height of the tank, with the annular space formed by the collector tray and the tank being covered, FIG. 10 is an elevation sectional view of a tank installation where the tank incorporates a cup-shaped separating bottom and whose wall is covered by an apron over its full height.

The tank illustrated in FIG. 1 consists of the bottom 1 connected to the wall 2 of the tank at 3 by welding in a conventional manner. The bottom 1 of the tank rests on a concrete ring 4. The space inside said concrete ring 4 can be filled up with a filler material in a well-known manner. The separating bottom 5 described in the present invention forms a gastight connection with the wall 2 of the tank through its flexibly constructed rim section 6. The gas pipe 12 enters the pipe 10, which communicates with the tank through pipes 11, over such a distance that the gas pressure is at least approximately in equilibrium with the hydrostatic pressure of the liquid in the tank and the dead weight of the separating bottom. The pipes 8 and 12 are connected to a gas pipe the delivery of which can be controlled by the tank filling pump.

Any leakage is indicated by the differential pressure gauge 13 of any conventional make, which, on the one hand, indicates the gas pressure in space G through the pipe 13a and, on the other, indicates the hydrostatic pressure acting on the separating bottom 5 through pipe 13b. When the bottom of the tank and the separating bottom are tight, the differential pressure is theoretically zero, if the weight of the separating bottom is disregarded. As the separating bottom is in practice not even and has a weight of its own, the differential pressure gauge 13 indicates a low over-pressure which remains constant also with varied filling levels and is, therefore, introduced into the measurement as a constant. If the bottom 1 of the tank springs a leak, gas escapes from space G; thus, there exists a difference from the hydrostatic pressure of the liquid in the tank. Indicated by the pressure gauge 13, this differential pressure can be utilized by audible, electric or other well-known equipment to trip existing alarms.

If the separating bottom 5 or the points where it is fastened to the wall 2 of the tank develop a crack or the like, liquid flows from space F into the gas-filled space G if the gas pressure drops below the hydrostatic pressure. Such a defect is also indicated by the differential pressure gauge 13 and, additionally, by the flow detector 14 connected to the gas-filled space G. This indication may also be used to trip a warning signal.

In the event of a leakage in the separating bottom 5 and/or in the bottom 1 of the tank, the pressure in space G can, in spite of the gas loss, be maintained by supplying gas through pipes 8.

To protect the separating wall 5 from an overload in the event of a drop in gas pressure in space G, this space is filled up with a load-bearing porous material 15.

The separating wall 5 illustrated in FIG. 2 forms a gastight connection with the wall 2 of the tank through flexible links 16 which essentially operate in the direction of the tank axis. Safety measures in the event of a leakage correspond to those described on the basis of FIG. 1.

The partition illustrated in FIG. 3 consists of a cup-shaped separating bottom 17 resting on the bottom 1 of the tank, the wall 17' of said bottom being covered by the apron 18 which forms a gas-tight connection with the wall 2 of the tank. The end 18a of the apron 18 directly adjoins the bottom section of the cup-shaped separating bottom 17. Upon filling the tank, the space between the wall 17' of the cup-shaped separating bottom 17 and the apron 18 is sealed off to prevent any leakage of gas as soon as the liquid has reached the botton end 18a of the apron 18. If the liquid in the tank continues rising, the gas volume between the wall 17' and the apron 18 is compressed. The pressure in this space corresponds to the difference from the hydrostatic pressure of the liquid, i.e. the level H of the liquid inside the tank, reduced by head h of the liquid column of the space between the wall 17' and the apron 18.

When gas is supplied through the pipe 19 while the tank is being filled h drops to zero if the corresponding amount of gas is supplied.

The pressure is measured in the same manner as described referring to FIG. 1. If no gas is supplied while the tank is being filled, h rises with increasing filling level H. To prevent the liquid column h from reaching the rim 17a of the wall 17' of the separating bottom 17, the apron 18 can be appropriately designed, for instance as a truncated cone with its small diameter facing the bottom, as in this case, with increasing filling level H, the volume of the gas space drops faster and thus the gas pressure required to maintain equilibrium in the gas-filled space is reached at a lower h.

If the bottom 1 of the tank springs a leak, gas escapes from space G. The differential pressure gauge 13 indicates this pressure drop which in turn trips an alarm, as described above. In the event of a leakage in the cup-shaped separating bottom 17, liquid flows into the gas-filled space G. This condition is indicated by the flow detector 14. In the event of a leakage in the bottom 1 of the tank, the associated loss of gas can be counterbalanced by supplying gas through the pipe 19. Also this prevents liquid from running out of the tank.

The bottom section of the cup-shaped separating bottom 17 illustrated in FIG. 4 is raised or crowned toward the interior of the tank. This arrangement ensures that in the event of a leakage in the section of said separating bottom corresponding to the diameter D no liquid enters the gas-filled space as there the gas pressure is higher than the hydrostatic pressure of the liquid in the raised range of the separating bottom 17. The end 18a of the apron, which determines the maximum gas pressure, is located at a lower level than the raised range of the separating bottom 17. The drop in pressure occurring in the gas space in the event of a leakage in this section is indicated by the differential pressure gauge 13 as described in the foregoing examples and utilized to trip safety devices, particularly for supplying gas through the pipe 19 to maintain the gas pressure. The same arrangement is adopted in the event of a leakage in the bottom 1 of the tank.

The separation of spaces G and F illustrated in FIG. 5 is accomplished by the use of a cup-shaped, inverted separating bottom 20. The bottom 1 of the tank is raised in the range of the section of the separating bottom 20 covering the bottom 1 so that, with the tank empty, this separating bottom 20 may be relieved of its load by being capable of resting on the raised section of the bottom. The rim 20a forms a clearance with the corresponding section of the bottom so that the liquid can enter the space formed by the sidewalls of the raised section of the bottom and the wall of the inverted separating bottom 20. Upon replenishment of the tank filling, the gas trapped in this space is compressed. Its pressure depends on the hydrostatic head of the tank filling so that the same conditions are created as in the examples described above. At the time of filling the tank, the gas pipe 21 supplies gas from the outside into the gas-filled space so that its gas pressure is set at the hydrostatic pressure prevailing at the rim 20a. With a tight bottom of the tank in the range of the section covered by the inverted separating bottom 20 and with a tight separating bottom 20, the gas pressure and the hydrostatic pressure of the liquid in the tank indicated by the differential pressure gauge 13 are in equilibrium.

If the covered section of the bottom and/or the inverted separating bottom 20 springs a leak, the gas pressure drops; the differential pressure gauge 13 indicates this deviation so that an alarm is tripped. By introducing additional gas through the pipe 21 into the gas-filled space, the original gas pressure can be restored and maintained.

The amount of displaced liquid imparts to the inverted separating bottom 20 a buoyancy which is counteracted by the weight 22 resting on the separating bottom 20.

During the storage of extremely cold, liquefied gases, the supply of heat, which not even an expensive insulation can avoid, causes steady evaporation. This physical phenomenon causes the annular space, which is required to seal the liquid space from the gas-tight filled space, to be continuously supplied with gas during operation so that the liquid level in this annular space illustrated in FIG. 4 is given by the bottom edge 18a of the apron 18 or by the bottom edge 20a of the separating bottom 20 illustrated in FIG. 5, in other words, h equals 0. Thus, the gas in these annular spaces is subject to the hydrostatic pressure corresponding to the respective filling level in the tank. Therefore, upon filling the tank with extremely cold, liquefied gases, additional gas has to be supplied into the annular space only in the event of a leakage.

Acting on the gas side of the apron 18 is the even load resulting from the gas pressure, and acting on the liquid side of the apron is the hydrostatic pressure of the liquid which drops with decreasing head. Therefore, the pressure acting on the gas side of the apron is no longer fully balanced by the hydrostatic back pressure. According to the present invention, this can be counteracted by appropriate selection of the apron material or by fitting stiffening rings and/or crimps.

As described above, gas can be supplied to the gas-filled space in the event of a leakage. The amount of gas supplied may serve as a measure of the leakage occurred. Therefore, according to the present invention, the amount of gas to be supplied through pipes 8, 19, and 21 respectively is gauged by measuring and recording equipment. Such an arrangement may be adopted to take the necessary safety measures.

FIGS. 6 do not show the equipment for indicating a leakage and/or averting its consequences on the bottom 1 of the tank illustrated in FIGS. 1 to 5.

The tank illustrated in FIG. 6 is arranged in the collector tray 23 whose shell 24 and bottom 25 consist of steel and concrete.

The tank illustrated in FIG. 7 is surrounded by a collector tray 23 whose shell 24 consists of steel welded onto the extended steel bottom 1 of the tank. The tank and the collector tray 23 rest on an annular foundation 27.

The tank illustrated in FIG. 8 is arranged in a steel and concrete tray 23 whose bottom 25 represents the annular foundation for the tank installation. The bottom 1 of the tank, which consists of steel, extends beyond the tank, is of angular shape and inserted into the groove 28 of the bottom 25 of the tray. The groove 28 is filled up with an elastic sealing compound, for instance, a polysulfide rubber base compound. The angle-shaped section of the bottom 1 of the tank is anchored in steel concrete. Expansion and contraction of the concrete resulting from temperature fluctuations and/or static alternating stresses are made possible by the sealing compound.

As illustrated in FIG. 9, the shell 24 of the collector tray 25 extends over the full height of the tank, although this is not necessary to collect the liquid issuing from the tank in the event of a leakage as the cross section of the tank is always smaller than that of the collector tray. By the ratio of these two dimensions the necessary height of the collector tray is always smaller than that of the tank. However, in order to provide an additional mechanical and/or thermal protection, the height of the collector tray selected in this embodiment equals that of the tank.

The annular space the tank forms with the collector tray 23 is covered by the roof section 29 in such a manner that a ring-shaped vent slot 30 is obtained. This arrangement results in a dry annular space which facilitates monitoring the tank and precludes the uncontrolled leakage of liquid, mixed with rain and spray water going into the sewer.

The air cushion so created in the annular space not only provides satisfactory thermal insulation but also reduces evaporation losses. For the storage of dense liquids which have to be heated up prior to extraction, the existing thermal insulation reduces heat losses and running operating cost.

FIG. 10 illustrates an embodiment wherein the equipment indicating a leakage and averting its consequences for the bottom 1 of the tank illustrated in FIG. 3 is used also for the wall 2 of the tank. The cup-shaped separating bottom 17 is covered by the apron 18 which forms a gastight connection with the upper rim of the wall 2 of the tank. The space between the wall 2 of the tank and the wall 17' of the cup-shaped separating bottom 17 is filled with gas, for instance air.

The annular space between the wall 17' and the apron 18 is filled partly with gas and partly with the liquid stored in the tank. Upon filling the tank, the liquid in the annular space between the apron 18 and the wall 17' of the separating bottom 17 will rise until the hydrostatic pressure of the liquid in the tank corresponds to the gas pressure in the spaces between the wall 2 and the wall 17' as well as partly between the wall 17' and the apron 18.

I claim:

1. A safety device for use in tanks for liquids, especially in large-capacity tanks for hydrocarbons or other liquids capable of polluting the environment, for indicating a leakage and averting its consequences, comprising a separating bottom inside said tank above the bottom of said tank providing a gas-tight seal in a cross section of a tank in the vicinity of the bottom, said separating bottom in conjunction with the bottom of the tank forming a space which is free from any liquid, said space being filled with gas, means to measure the gas pressure in said space and means for maintaining the gas pressure approximately corresponding to the hydrostatic pressure of the liquid inside the tank.

2. A device as defined in claim 1 wherein said separating bottom is connected to the wall of said tank so as to be gastight.

3. Apparatus as in claim 2 wherein said bottom is flexibly connected to said wall.

4. A device as defined in claim 1 wherein the tank for liquids is arranged in a collector tray so that in the event of a leakage, especially between the parts of the wall of the tank not covered by the separating bottom, the issuing liquid is collected.

5. A device as defined in claim 4 wherein with a metal construction of the shell of the collector tray, the bottom of the tank, also consisting of metal, extends beyond the latter up to the shell of the collector tray to which the bottom of the tank is joined, e.g. by welding, in such a manner which prevents any leakage of liquid.

6. A device as defined in claim 1 wherein the gas-filled space is connected through a pipe to an instrument which indicates the presence of any liquid in the gas-filled space.

7. A device as defined in claim 1 wherein a differential pressure gauge, indicates the pressure inside the gas-filled space as a function of the respective hydrostatic pressure, and the change in pressure following a leakage activates utilization means.

8. Apparatus as in claim 1 having means to control the gas pressure.

9. A safety device for use in tanks for liquids, especially in large-capacity tanks for hydrocarbons or other liquids capable of polluting the environment, for indicating a leakage and averting its consequences, comprising a separating bottom providing a gas-tight seal in a cross section of a tank in the vicinity of the bottom, said separating bottom in conjunction with the bottom of the tank forming a space which is free from any liquid, said space being filled with gas, means to measure the gas pressure approximately corresponding to the hydrostatic pressure of the liquid inside the tank and wherein said gas-filled space has stays which support the separating bottom upon a drop in the pressure prevailing inside the gas-filled space.

10. A safety device for use in tanks for liquids, especially in large-capacity tanks for hydrocarbons or other liquids capable of polluting the environment, for indicating a leakage and averting its consequences, comrprising a separating bottom providing a gas-tight seal in a cross section of a tank in the vicinity of the botttom, said separating bottom in conjunction with the bottom of the tank forming a space which is free from any liquid said space being filled with gas, means to measure the gas pressure approximately corresponding to the hydrostatic pressure of the liquid inside the tank and wherein said gas-filled space is filled up with porous material.

11. A safety device for use in tanks for liquids, especially in large-capacity tanks for hydrocarbons or other liquids capable of polluting the environment, for indicating a leakage and averting its consequences, comprising s separating bottom providing a gas-tight seal in a cross section of a tank in the vicinity of the bottom, said separating bottom in conjunction with the bottom of the tank forming a space which is free from any liquid, said space being filled with gas, means to measure the gas pressure approximately corresponding to the hydrostatic pressure of the liquid inside the tank and wherein said gas-filled space and liquid-filled space are sealed off against each other by a cup-shaped separating bottom supported by the bottom of the tank, the wall of said separating bottom being covered by an apron which forms a gastight connection with the wall of the tank in such a manner that a gastight separation of liquid and gas spaces and is accomplished upon filling the tank.

12. A device as defined in claim 11 wherein said apron is designed as an annular truncated cone with its small diameter facing the bottom to prevent the liquid from entering the gas-filled space upon a drop in gas pressure.

13. A device as defined in claim 11 wherein the design of said apron is such that its distance relative to its section extending along the wall of the tank from the wall of the cup-shaped separating bottom is larger than the distance between the latter and the wall of the tank.

14. A device as defined in claim 11 wherein the bottom section of said cup-shaped separating bottom is raised toward the interior of the tank in such a manner that as large a portion of this bottom section as possible is situated at a higher level than the bottom end of the apron.

15. A device as defined in claim 11 wherein in the upper area of the tank the apron forms a gastight connection with the wall of the tank, enclosing the wall of the cup-shaped separating bottom.

16. A device as defined in claim 15 wherein the apron is mounted at such a level that the top edge of the wall of the cup-shaped separating bottom lies above the maximum liquid level.

17. A safety device for use in tanks for liquids, especially in large-capacity tanks for hydrocarbons or other liquids capable of polluting the environment, for indicating a leakage and averting its consequences, comprising a separating bottom providing a gastight seal in a cross section of a tank in the vicinity of the bottom, said separating bottom in conjunction with the bottom of the tank forming a space which is free from any liquid, said space being filled with gas, means to measure the gas pressure approximately corresponding to the hydrostatic pressure of the liquid inside the tank and having a cup-shaped, inverted separating bottom, covering the major part of the bottom of the tank, this section of the bottom being designed in such a manner that the covered area of the bottom is situated at a higher level than the rim of the separating bottom.

18. A device as defined in claim 17 wherein the covered section of the bottom of the tank is designed in such a manner that, with the tank emptied, it serves as a support for the separating bottom.

19. A safety device for use in tanks for liquids, especially in large-capacity tanks for hydrocarbons or other liquids capable of polluting the environment, for indicating a leakage and averting its consequences, comprising a separating bottom providing a gastight seal in a cross section of a tank in the vicinity of the bottom, said separating bottom in conjunction with the bottom of the tank forming a space which is free from any liquid, said space being filled with gas, means to measure the gas pressure approximately corresponding to the hydrostatic pressure of the liquid inside the tank and wherein the tank for liquids is arranged in a collector tray so that in the event of a leakage, especially between the parts of the wall of the tank not covered by the separating bottom, the issuing liquid is collected and with a steel and concrete construction of the shell of the collector tray and its bottom, wherein the steel bottom of the tank extends beyond the latter to form an angular connection with the bottom of collector tray, which bottom may also serve as an annular foundation for the tank.

20. A device as defined in claim 19 wherein the extended and angled section of the bottom of the tank is inserted into the annular groove of the steel concrete bottom of the collector tray, the groove being filled up with an elastic compound.

21. A device as defined in claim 19 wherein the extended section of the bottom of the tank is flexibly constructed with its angled section firmly embedded in the bottom of the collector tray.

22. A safety device for use in tanks for liquids, especially in large-capacity tanks for hydrocarbons or other liquids capable of polluting the environment, for indicating a leakage and averting its consequences, comprising a separating bottom providing a gastight seal in a cross section of a tank in the vicinity of the bottom, said separating bottom in conjunction with the bottom of the tank forming a space which is free from any liquid, said space being filled with gas, means to measure the gas pressure approximately corresponding to the hydrostatic pressure of the liquid inside the the tank and wherein the tank for liquids is arranged in a collector tray so that in the event of a leakage, especially between the parts of the wall of the tank not covered by the separating bottom, the issuing liquid is collected and wherein the annular space formed by the tank and the collector tray incorporates an upper roof section having a ring-shaped vent slot.

23. A safety device for use in tanks for liquids, especially in large-capacity tanks for hydrocarbons or other liquids capable of polluting the environment, for indicating a leakage and averting its consequences, comprising a separating bottom providing a gastight seal in a cross section of a tank in the vicinity of the bottom, said separating bottom in conjunction with the bottom of the tank forming a space which is free from any liquid, said space being filled with gas, means to measure the gas pressure approximately corresponding to the hydrostatic pressure of the liquid inside the tank and wherein the tank for liquids is arranged in a collector tray so that in the event of a leakage, especially between the parts of the wall of the tank not covered by the separating bottom, the issuing liquid is collected and wherein the annular space formed by the tank and the collector tray incorporates a full-length upper roof section and an apron, provides a flexible, tight connection between the roof of the tank and the shell of the collector tray with the closed space thus formed vented through anti-flashback means.

24. A safety device for use in tanks for liquids, especially in large-capacity tanks for hydrocarbons or other liquids capable of polluting the environment, for indicating a leakage and averting its consequences, comprising a separating bottom providing a gas-tight seal in a cross section of a tank in the vicinity of the bottom, said separating bottom in conjunction with the bottom of the tank forming a space which is free from any liquid, said space being filled with gas, means to measure the gas pressure approximately corresponding to the hydrostatic pressure of the liquid inside the tank and having a means to measure and record the amount of gas supplied as replenishment into a gas-filled space, in the event of a leakage.

* * * * *